(12) United States Patent
Cao et al.

(10) Patent No.: US 12,279,334 B2
(45) Date of Patent: Apr. 15, 2025

(54) TECHNIQUES FOR MULTICAST AND UNICAST CONVERGENCE IN WIRELESS COMMUNICATIONS

(71) Applicant: QUALCOMM Incorporated, San Diego, CA (US)

(72) Inventors: Yiqing Cao, Beijing (CN); Yan Li, Beijing (CN); Thomas Stockhammer, Bergen (DE); Zhimin Du, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 17/796,504

(22) PCT Filed: Mar. 20, 2020

(86) PCT No.: PCT/CN2020/080394
§ 371 (c)(1),
(2) Date: Jul. 29, 2022

(87) PCT Pub. No.: WO2021/184349
PCT Pub. Date: Sep. 23, 2021

(65) Prior Publication Data
US 2023/0354473 A1 Nov. 2, 2023

(51) Int. Cl.
*H04W 76/40* (2018.01)
*H04W 76/10* (2018.01)
*H04W 76/30* (2018.01)

(52) U.S. Cl.
CPC .......... *H04W 76/40* (2018.02); *H04W 76/10* (2018.02); *H04W 76/30* (2018.02)

(58) Field of Classification Search
None
See application file for complete search history.

(56) References Cited

U.S. PATENT DOCUMENTS

| | | | |
|---|---|---|---|
| 2014/0211685 A1* | 7/2014 | Kim | H04W 72/30 370/312 |
| 2016/0119762 A1* | 4/2016 | Zhu | H04B 7/0452 370/312 |
| 2018/0270624 A1* | 9/2018 | Lee | H04L 65/1063 |
| 2021/0211845 A1* | 7/2021 | Lin | H04W 4/40 |
| 2021/0378053 A1* | 12/2021 | Saily | H04W 48/20 |
| 2022/0330100 A1* | 10/2022 | Liu | H04W 76/40 |

FOREIGN PATENT DOCUMENTS

| | | |
|---|---|---|
| CN | 1046400477 A | 5/2015 |
| EP | 2362705 A1 | 8/2011 |
| EP | 3678390 A1 | 7/2020 |
| EP | 3723395 A1 | 10/2020 |

(Continued)

OTHER PUBLICATIONS

Supplementary European Search Report—EP20926017—Search Authority—Munich—Nov. 3, 2023.

(Continued)

*Primary Examiner* — Eunsook Choi
(74) *Attorney, Agent, or Firm* — Arent Fox, LLP

(57) ABSTRACT

Aspects described herein relate to managing and/or configuring, for a user equipment (UE), unicast and/or multicast radio bearers for unicast and/or multicast cells based on measurement reports generated by the UE.

30 Claims, 7 Drawing Sheets

(56) References Cited

FOREIGN PATENT DOCUMENTS

| | | |
|---|---|---|
| WO | 2015000912 A1 | 1/2015 |
| WO | 2018001897 A1 | 1/2018 |
| WO | 2019057072 A1 | 3/2019 |
| WO | 2019129212 A1 | 7/2019 |
| WO | 2019161927 A1 | 8/2019 |
| WO | 2020035795 A1 | 2/2020 |

OTHER PUBLICATIONS

International Search Report issued in corresponding International Application No. PCT/CN2020/080394 dated Dec. 21, 2020.

* cited by examiner

TECHNIQUES FOR MULTICAST AND UNICAST CONVERGENCE IN WIRELESS COMMUNICATIONS

CROSS-REFERENCE TO RELATED APPLICATIONS

This application is a 35 U.S.C. § 371 National Phase Application of PCT Application No. PCT/CN2020/080394 filed Mar. 20, 2020, entitled "TECHNIQUES FOR MULTICAST AND UNICAST CONVERGENCE IN WIRELESS COMMUNICATIONS," which is assigned to the assignee hereof and expressly incorporated by reference herein for all purposes.

BACKGROUND

Aspects of the present disclosure relate generally to wireless communication systems, and more particularly, to multicast and unicast communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, devices, such as user equipment (UEs) can be configured for multicast or unicast communications with a cell.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes transmitting, to a base station, a measurement report including measurements of signals received from one or more cells, and receiving, from the base station and based on the measurement report, at least one of a request to setup or release a unicast radio bearer or a multicast radio bearer for at least one cell of the one or more cells, a request to setup a unicast protocol data unit (PDU) session over a unicast radio bearer, a command for multicast and unicast switching, or any combination thereof, where the unicast PDU session and a multicast PDU session correspond to same content from a same origin server.

In another example, a method for wireless communication is provided. The method includes receiving, from a user equipment (UE), a measurement report including measurements of signals received from one or more cells, and transmitting, to the UE and based on the measurement report, at least one of a request to setup or release a unicast radio bearer or a multicast radio bearer for at least one cell of the one or more cells, a request to setup a unicast PDU session over a unicast radio bearer, or a command for multicast and unicast switching, where the unicast PDU session and a multicast PDU session correspond to same content from a same origin server.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
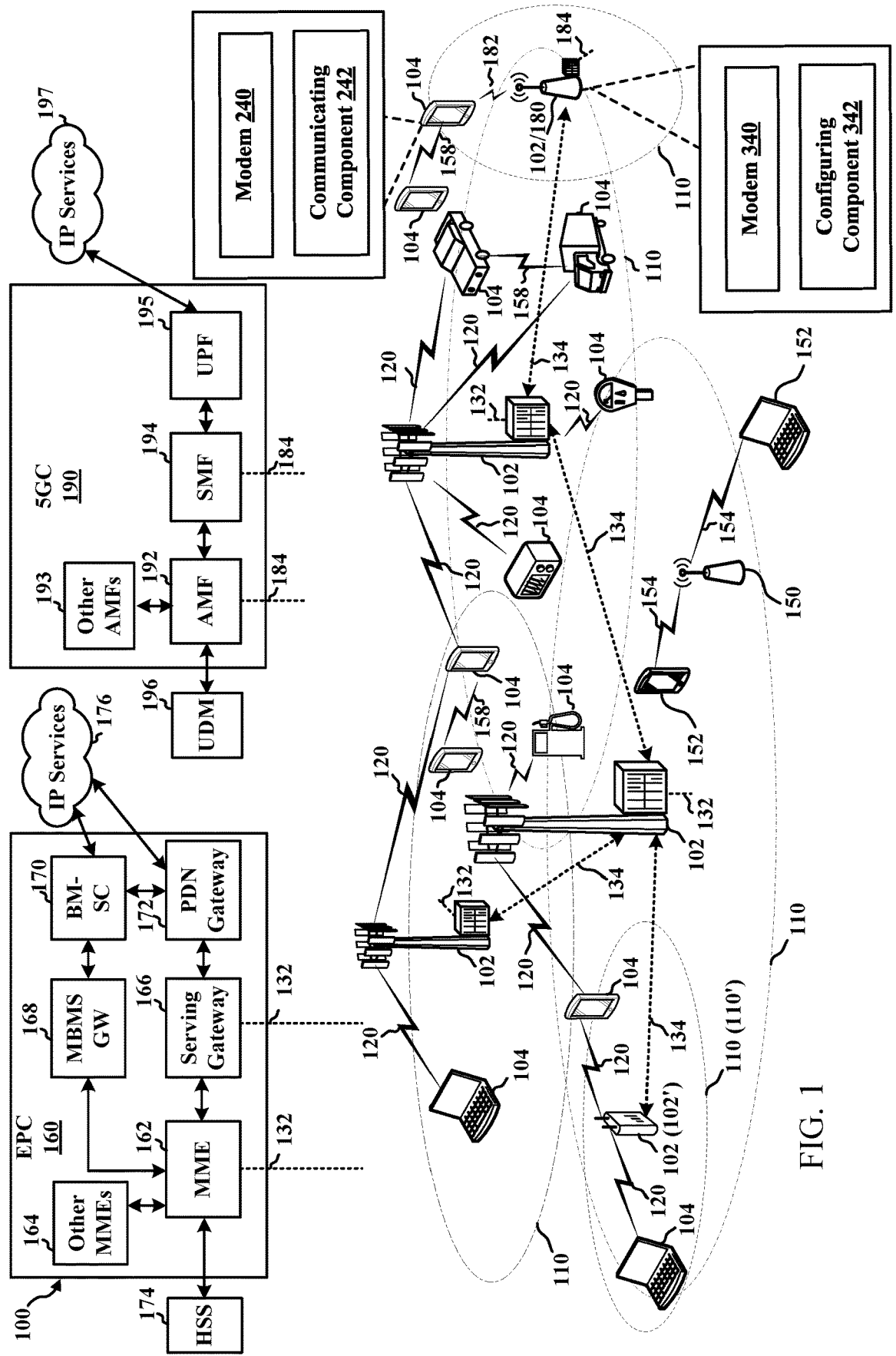
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to facilitating multicast and unicast convergence in wireless communications. In an example, cell measurements reported by a user equipment (UE) can be used to at least one of setup or release unicast or multicast radio bearers, setup unicast protocol data unit (PDU) sessions, perform multicast and unicast switching, etc. In an example, in fifth generation (5G) new radio (NR) or similar wireless communication technologies, a device (e.g., a UE) can include a multicast stack for multicast communications and a unicast stack for unicast communications, where the stacks can be provided between an application layer and a corresponding multicast and unicast radio bearers. For example, the network model for the UE can include a radio layer with at least one multicast bearer and at least one unicast bearer, which is below an internet protocol (IP) layer for multicast and/or unicast, which is below a user datagram protocol (UDP) and/or transmission control protocol (TCP)/IP layer, which is below the multicast stack and the unicast stack, which are below a data packaging layer (e.g., which can package data into common media application format (CMAF) chunks), which is below a data layer receiving data of different formats from an application layer. For example, the multicast stack can provide file delivery over unidirectional transport (FLUTE) and/or real-time object delivery over unidirectional transport (ROUTE). For example, the unicast stack can be TCP/IP or UDP based and may provide dynamic adaptive streaming over hypertext transfer protocol (HTTP) (DASH), quick UDP internet connections (QUIC), HTTP live streaming (HLS), etc.

Given this structure, or other possible structures to support multicast and unicast communications for a device (e.g., UE), multicast and/or unicast bearers can be setup (e.g., established) and/or released based on cell measurement reports received from the device. In addition, unicast PDU session and/or multicast and unicast switching can be performed based on the cell measurement reports. In one example, multimedia broadcast multicast service (MBMS) operation on demand (MOOD) can be used for multicast/unicast radio bearer setup operations. MOOD is defined in long term evolution (LTE) as an operation that allows dynamic switching between unicast and broadcast (e.g., multicast) over LTE, based on configured triggers, and can be used herein to setup or release multicast and unicast radio bearers where multicast and unicast radio bearers may be setup at a given instant in time. For multicast and unicast PDU session, the radio access network (RAN) can setup at least two separate radio bearers. In aspects described herein, devices can operate in various states of having a multicast radio bearer and multicast PDU session, a unicast radio bearer and unicast PDU session, and/or both. This can facilitate multicast and unicast communication setup to support the multicast and unicast structure of the device.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for communicating based on multicast and/or unicast communications, in accordance with aspects described herein, and some nodes may have a modem 340 and configuring component 342 for configuring multicast and/or unicast communications, in accordance with aspects described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 can perform multicast and unicast communications by setting up separate multicast and unicast radio bearers (e.g., with a multicast and unicast cell). For example, communicating component 242 can send a cell measurement report to the base station 102 providing one of a unicast or multicast cell. Configuring component 342 of the base station 102 can receive the cell measurement report and can accordingly setup, or cause setup of, a multicast or unicast connection (or corresponding radio bearer) for the UE 104 (e.g., to a different cell of a different or the same base station 102) to allow the UE 104 to communicate using multicast and unicast. Configuring component 342 can additionally release the multicast or unicast connection (or corresponding bearer), establish a unicast PDU session, perform multicast and unicast switching, etc. based on the cell measurement report.

Figure 2:
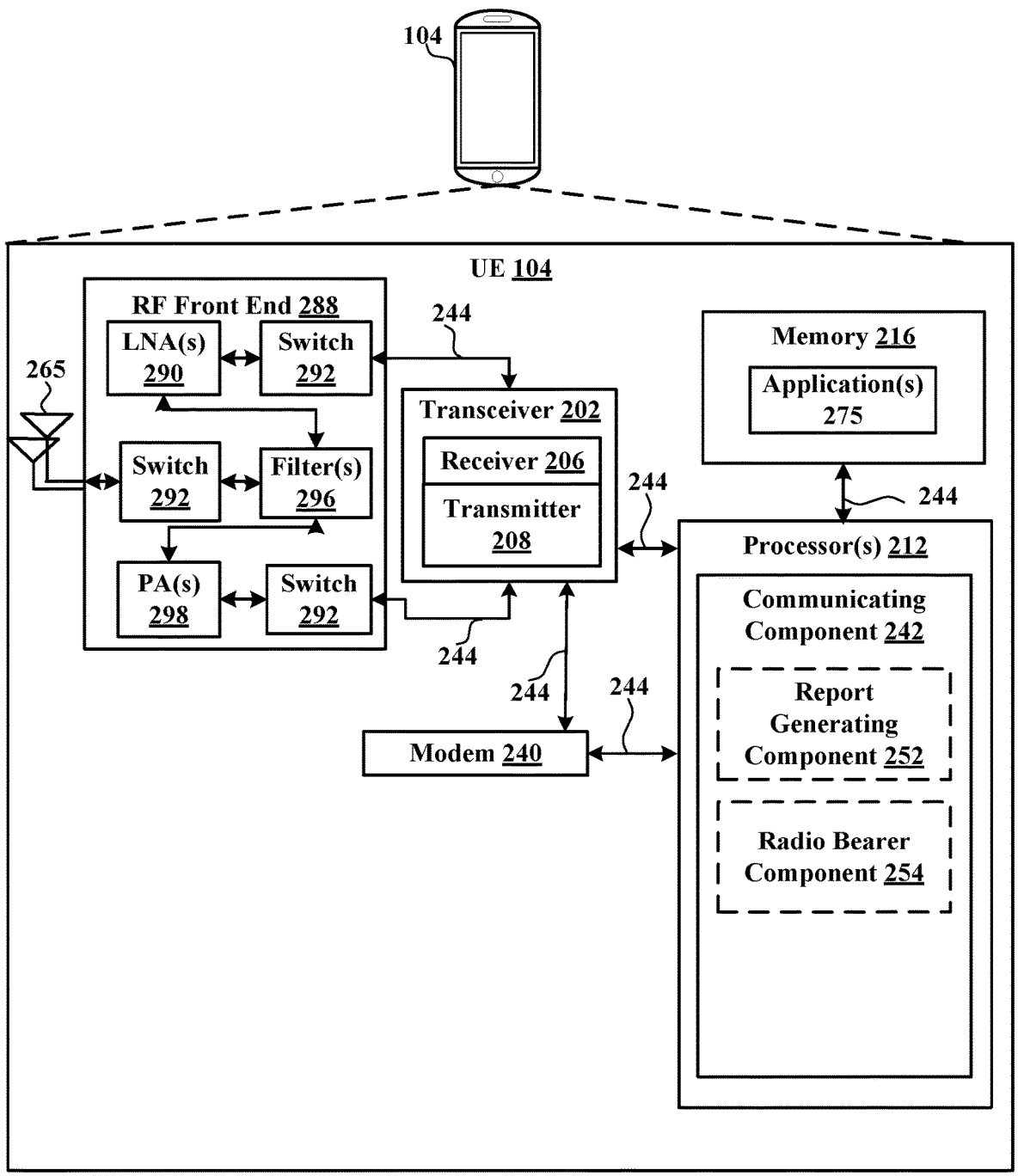
FIG. 2 is a block diagram illustrating an example of a UE, in accordance with various aspects of the present disclosure.
Figure 3:
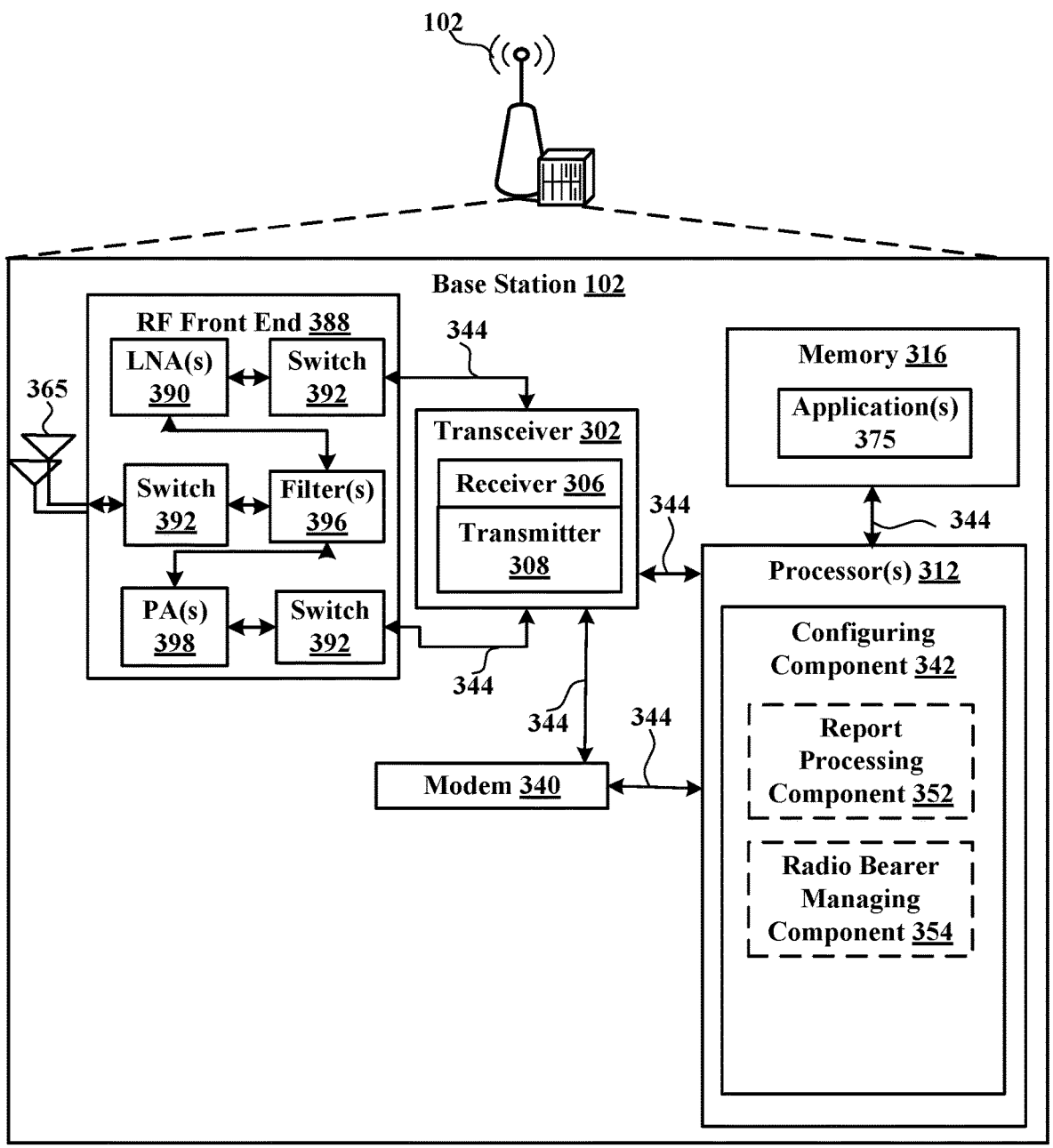
FIG. 3 is a block diagram illustrating an example of a base station, in accordance with various aspects of the present disclosure.
Figure 4:
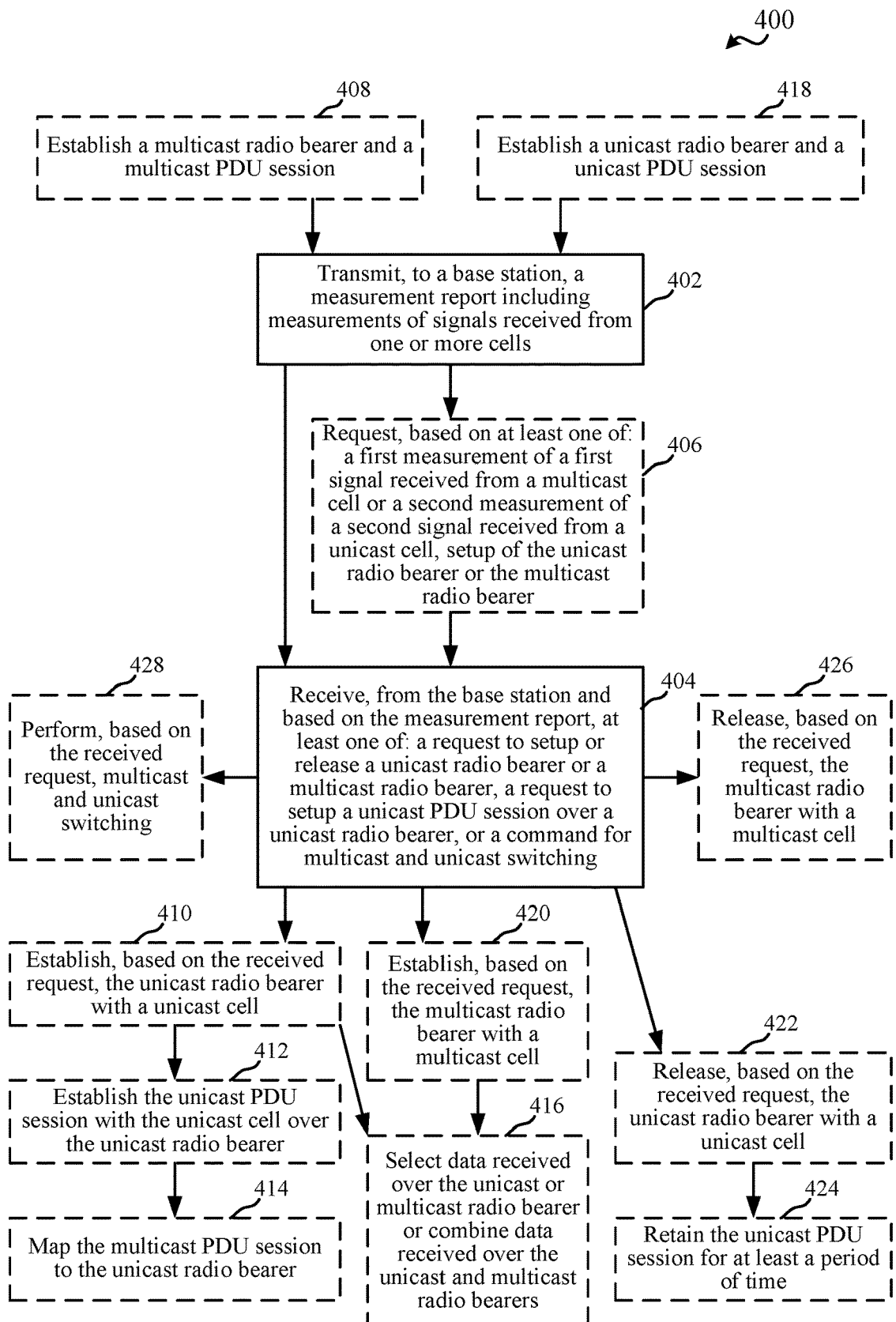
FIG. 4 is a flow chart illustrating an example of a method for managing a unicast and/or multicast radio bearer with a unicast and/or multicast cell, in accordance with various aspects of the present disclosure.
Figure 5:
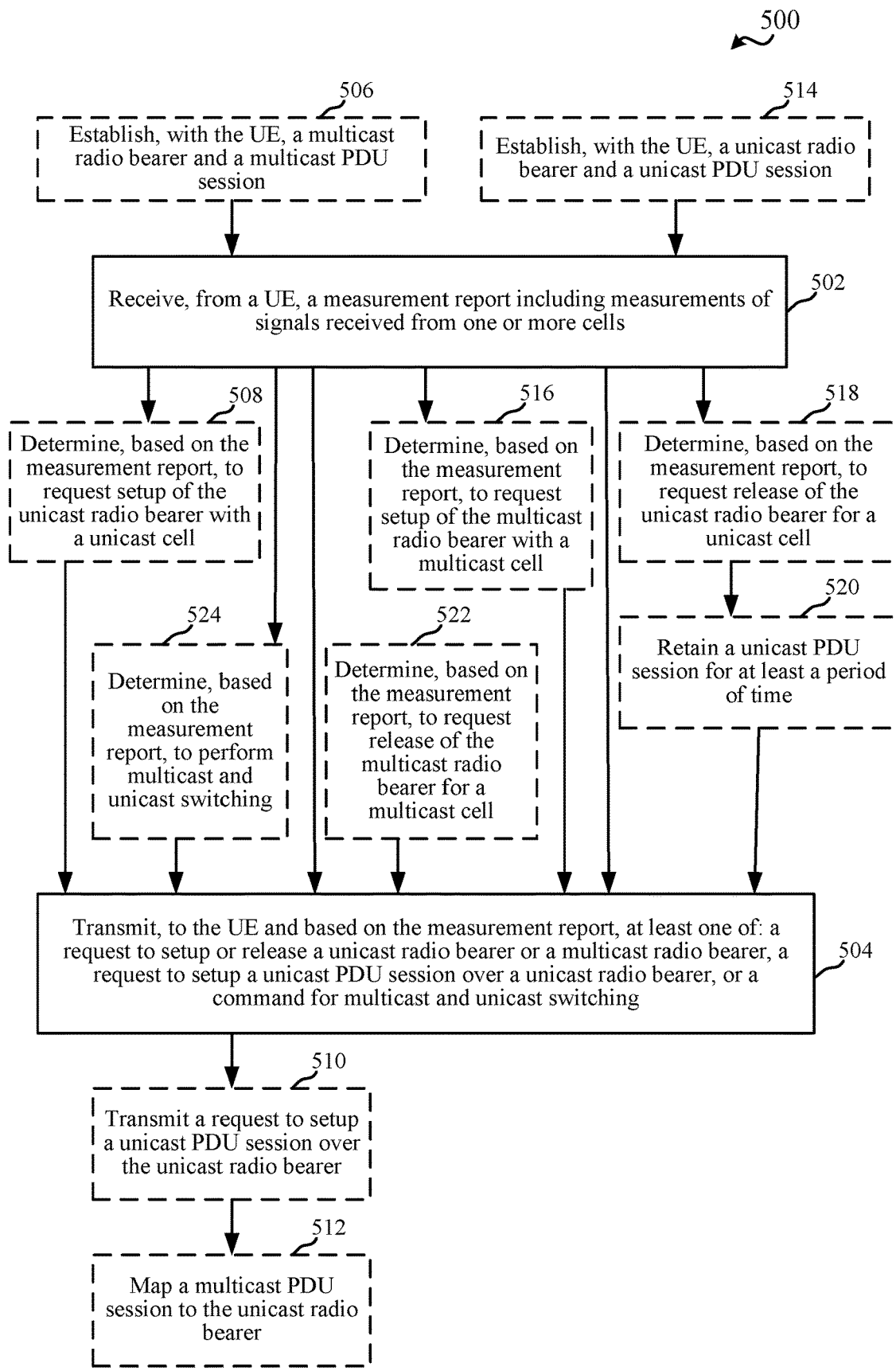
FIG. 5 is a flow chart illustrating an example of a method for configuring a unicast and/or multicast radio bearer with a unicast and/or multicast cell, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for communicating based on multicast and/or unicast communications, as described further herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a report generating component 252 for generating a cell measurement report, and/or a radio bearer component 254 for configuring a radio bearer and/or related PDU session based on the cell measurement report and/or instructions from a base station 102, as described further herein.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for configuring multicast and/or unicast communications, as described further herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a report processing component 352 for processing a cell measurement report received from a UE 104, and/or a radio bearer managing component 354 for configuring radio bearers and/or corresponding PDU sessions for the UE 104 based on measurements received in the cell measurement report, as described further herein.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for configuring communicating using multicast and/or unicast communications. FIG. 5 illustrates a flow chart of an example of a method 500 for configuring multicast and/or unicast communications. In an example, a UE can perform the functions described in method 400 using one or more of the components described in FIGS. 1 and 2. Methods 400 and 500 are described below in conjunction with one another to ease explanation of the associated functions and concepts. Methods 400 and 500 are not required to be performed in conjunction with one another, and indeed one device can be configured to perform method 400 without having a corresponding device that performs method 500 and vice versa, in at least one example.

In method 400, at Block 402, a measurement report including measurements of signals received from one or more cells can be transmitted to a base station. In an aspect, report generating component 252, e.g., in conjunction with processor(s) 212, memory 216, transceiver 202, communicating component 242, etc., can generate and transmit, to the base station (e.g., base station 102), the measurement report including measurements of signals received from one or more cells. For example, report generating component 252 can periodically measure signals received from neighboring cells and can record the measurements in a measurement report (e.g., along with cell identifying information). For example, the signal received from the neighboring cells can include synchronization signal block (SSB) signals, channel state information reference signals (CSI-RSs), cell-specific reference signals (CRSs), or other types of signals.

In an example, report generating component 252 can periodically transmit the measurement report to the base station 102 (e.g., to a serving cell) and/or can transmit the measurement report based on one or more triggers. In an example, the one or more triggers may include a determination related to a signal strength of a serving cell and one or more other cells (e.g., a determination that a signal strength of the serving cell does not achieve a threshold and/or that a signal strength of a neighboring cell achieves a threshold, etc.). Additionally, the measurements may include a reference signal received power (RSRP), reference signal received quality (RSRQ), signal-to-noise ratio (SNR), signal-to-interference-and-noise ratio (SINR), or other measurements of the signals received from the one or more cells.

In an example, report generating component 252 can receive, from the base station 102, a measurement configuration for measuring one or more cells, which may include a neighbor list of neighboring cells to be measured, measurement thresholds for which to report measurements, measurement units or quantities to be measured (e.g., RSRP, RSRQ, SNR, SINR, etc.), and/or the like, and report generating component 252 can generate and/or transmit the measurement report based on the measurement configuration.

In method 500, at Block 502, a measurement report including measurements of signals received from one or more cells can be received from a UE. In an aspect, report processing component 352, e.g., in conjunction with processor(s) 312, memory 316, transceiver 302, configuring component 342, etc., can receive, from the UE (e.g., UE 104), the measurement report including measurements of signals received from the one or more cells. As described, for example, report processing component 352 can receive the measurement report from the UE 104 periodically and/or based on one or more triggers detected by the UE.

In method 500, at Block 504, at least one of a request to setup or release a unicast radio bearer or a multicast radio bearer, a request to setup a unicast PDU session over a unicast radio bearer, or a command for multicast and unicast switching can be transmitted to the UE based on the measurement report. In an aspect, radio bearer managing component 354, e.g., in conjunction with processor(s) 312, memory 316, transceiver 302, configuring component 342, etc., can transmit, to the UE (e.g., UE 104) and based on the measurement report, at least one of the request to setup or release the unicast radio bearer or the multicast radio bearer, the request to setup the unicast PDU session over the unicast radio bearer, or the command for multicast and unicast switching.

For example, as described in various examples herein, radio bearer managing component 354 can determine to setup unicast or multicast radio bearers to cells having a measurement that achieves a threshold and/or where a serving cell (e.g., that provides the other of the multicast or unicast cell) achieves or does not achieve a threshold. In another example, radio bearer managing component 354 can determine to release unicast or multicast radio bearers from cells having a measurement that does not achieve a threshold and/or where a serving cell (e.g., that provides the other of the multicast or unicast cell) achieves or does not achieve a threshold. In another example, radio bearer managing component 354 can determine to request to setup the unicast PDU with the unicast cell where the unicast cell has a measurement that achieves a threshold, determine to perform unicast or multicast switching based on the measurements, etc.

In method 400, at Block 404, at least one of a request to setup or release a unicast radio bearer or a multicast radio bearer, a request to setup a unicast PDU session over a unicast radio bearer, or a command for multicast and unicast switching can be received from the base station and based on the measurement report. In an aspect, radio bearer component 254, e.g., in conjunction with processor(s) 212, memory 216, transceiver 202, communicating component 242, etc., can receive, from the base station (e.g., base station 102) and based on the measurement report, at least one of a request to setup or release a unicast radio bearer or a multicast radio bearer, a request to setup a unicast PDU session over a unicast radio bearer, or a command for multicast and unicast switching. As described in various examples herein, the UE 104 can comply with the request by establishing or releasing a radio bearer or corresponding PDU session, performing multicast or unicast switching, etc. In addition, in various examples described herein, the UE 104 can operate in one of multiple possible states, which may include a first state where the UE 104 has a multicast radio bearer (and corresponding PDU session) configured but no unicast bearer, a second state where the UE 104 has a unicast radio bearer (and corresponding PDU session) configured but no multicast radio bearer, or a third state where the UE 104 has a multicast radio bearer and a unicast radio bearer (and corresponding PDU sessions) configured, etc.

Figure 6:
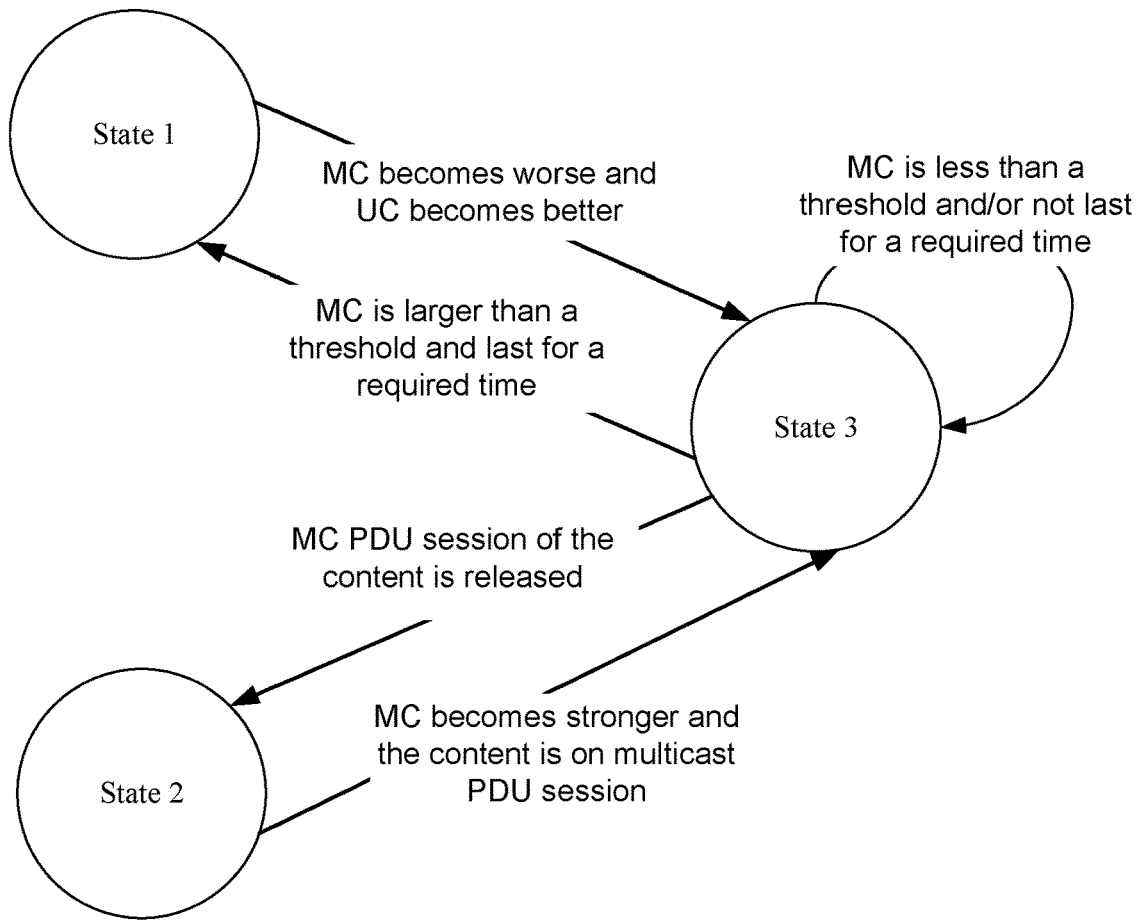
FIG. 6 illustrates an example of a state diagram for managing a unicast and/or multicast radio bearer with a unicast and/or multicast cell, in accordance with various aspects of the present disclosure.

FIG. 6 illustrates an example of a state diagram 600 in accordance with aspects described herein. State diagram 600 includes State 1 where the UE 104 is configured with a multicast bearer (MRB) and a multicast PDU session, State 2 where the UE 104 is configured with a unicast radio bearer (URB) and a unicast PDU session, and State 3 where the UE 104 is configured with both a MRB and URB and corresponding PDU sessions. In State 3, for example, PDU sessions can be on the same content from same origin server. For example, the UE 104 can transition between states based on measurement reports of measurements of signals received from cells, as described herein. In an example, UE 104 can transition from State 1 to State 3 when the multicast cell (MC) (e.g., a measurement of a signal received from the MC) becomes worse than a threshold and the unicast cell (UC) (e.g., a measurement of a signal received from the UC) becomes better than a threshold. The UE 104 can transition from State 3 back to State 1 when the MC (e.g., a measurement of a signal received from the MC) is larger than a threshold for a required time. The UE 104 can stay in State 3 where the MC is less than a threshold and/or does not last for a required time. The UE 104 can transition from State 3 to State 2 when the MC (e.g., a measurement of a signal received from the MC) becomes stronger and the content is on the multicast PDU session. The UE 104 can transition from State 2 to State 3 when the multicast PDU session of the content is released. In these examples, when the UE receives data from two or more radio bearers (RBs), the UE can select the data from better radio connection and discard another, or can combine the data, as described further herein.

In method 400, optionally at Block 406, setup of the unicast radio bearer or the multicast radio bearer can be requested based on at least one of a first measurement of a first signal received from a multicast cell or a second measurement of a second signal received from a unicast cell. In an aspect, radio bearer component 254, e.g., in conjunction with processor(s) 212, memory 216, transceiver 202, communicating component 242, etc., can request, based on at least one of a first measurement of a first signal received from a multicast cell or a second measurement of a second signal received from a unicast cell, setup of the unicast radio bearer or the multicast radio bearer. For example, radio bearer component 254 can request setup of the unicast radio bearer where a cell measurement of a unicast cell achieves a threshold and/or where a cell measurement of a serving multicast cell does not achieve a threshold. In another example, radio bearer component 254 can request setup of the multicast radio bearer where a cell measurement of a multicast cell achieves a threshold and/or where a cell measurement of a serving unicast cell does not achieve a threshold, etc. In other examples, the base station 102 can determine whether to setup the unicast or multicast radio bearer, as described herein.

In method 400, optionally at Block 408, a multicast radio bearer and a multicast PDU session can be established. In an aspect, radio bearer component 254, e.g., in conjunction with processor(s) 212, memory 216, transceiver 202, communicating component 242, etc., can establish (e.g., with a base station 102) the multicast radio bearer and the multicast PDU session. For example, radio bearer component 254 can establish the multicast radio bearer with a multicast serving cell, and thus can transmit the measurement report to the multicast serving cell for possibly setting up a unicast radio bearer.

In method 500, optionally at Block 506, a multicast radio bearer and a multicast PDU session can be established with the UE. In an aspect, radio bearer managing component 354, e.g., in conjunction with processor(s) 312, memory 316, transceiver 302, configuring component 342, etc., can establish, with the UE, the multicast radio bearer and the multicast PDU session. In this example, base station 102 may receive, from the UE 104, the measurement report and may determine to setup a unicast cell for the UE 104 based on the measurement report to provide multicast and unicast services. In this example, the UE 104 can be operating in State 1, as described in FIG. 6.

In this example, in method 500, optionally at Block 508, it can be determined, based on the measurement report, to request setup of the unicast radio bearer with a unicast cell. In an aspect, radio bearer managing component 354, e.g., in conjunction with processor(s) 312, memory 316, transceiver 302, configuring component 342, etc., can determine, based on the measurement report, to request setup of the unicast radio bearer with the unicast cell. For example, radio bearer managing component 354 can determine to request setup of the unicast radio bearer based on a cell measurement reported by the UE 104 for the unicast cell. In an example, where the cell measurement for the unicast cell achieves a threshold and/or where a cell measurement for the serving multicast cell provided by the base station 102 does not achieve a threshold, radio bearer managing component 354 can determine to request setup of the unicast radio bearer. In this example, radio bearer managing component 354 can transmit (e.g., to UE 104 at Block 504) the request to setup the unicast radio bearer.

In this example, receiving at Block 404 can include receiving, from the base station and based on the measurement report, the request to setup the unicast radio bearer. Accordingly, in this example in method 400, optionally at Block 410, the unicast radio bearer can be established with the unicast cell. In an aspect, radio bearer component 254, e.g., in conjunction with processor(s) 212, memory 216, transceiver 202, communicating component 242, etc., can establish, based on the received request, the unicast radio bearer with the unicast cell. For example, radio bearer component 254 and/or radio bearer managing component 354 can cause the UE 104 to perform a MOOD operation to setup the unicast radio bearer with the unicast cell, where the unicast cell can be a different cell than (or the same cell as) the established multicast cell. In this example, the UE 104 can transition from State 1 to State 3, as described. In this example, the core network function can setup the URB for the UE and can push data contents on both the URB and MRB. As described, the base station 102 can setup the URB for the UE 104 per UE's request or without UE's request.

In addition in this example, in method 500, optionally at Block 510, a request to setup a unicast PDU session over the unicast radio bearer can be transmitted. In an aspect, radio bearer managing component 354, e.g., in conjunction with processor(s) 312, memory 316, transceiver 302, configuring component 342, etc., can transmit the request to setup the unicast PDU session over the unicast radio bearer. In this example in method 400, optionally at Block 412, the uncast PDU session with the unicast cell can be established over the unicast radio bearer. In an aspect, radio bearer component 254, e.g., in conjunction with processor(s) 212, memory 216, transceiver 202, communicating component 242, etc., can establish the unicast PDU session with the unicast cell over the unicast radio bearer. The unicast PDU session can be established over the radio bearer to facilitate unicast communications between the UE 104 and the network.

In addition in this example, in method 500, optionally at Block 512, a multicast PDU session can be mapped to the unicast radio bearer. In an aspect, radio bearer managing component 354, e.g., in conjunction with processor(s) 312, memory 316, transceiver 302, configuring component 342, etc., can map the multicast PDU session to the unicast radio bearer. In this example in method 400, optionally at Block 414, the multicast PDU session can be mapped to the unicast radio bearer. In an aspect, radio bearer component 254, e.g., in conjunction with processor(s) 212, memory 216, transceiver 202, communicating component 242, etc., can map the multicast PDU session to the unicast radio bearer. In this example, unicast and multicast switching can be performed over the same radio bearer, as described herein, such to mitigate establishing more than one radio bearer (e.g., where the unicast and multicast cell are the same cell). In one example, one PDU session can map to one MRB or one URB while one RB can map to one quality-of-service (QoS) flow (e.g., the RBs can map to different QoS flows).

In addition, in an example, when the UE 104 has a MRB and URB setup as in Blocks 408 and 410, optionally at Block 416, data received over the unicast or multicast radio bearer can be selected or data received over the unicast and multicast radio bearers can be combined. In an aspect, communicating component 242, e.g., in conjunction with processor(s) 212, memory 216, transceiver 202, etc., can select data received over the unicast or multicast radio bearer or combine data received over the unicast and multicast radio bearers where both radio bearers are setup.

In another example, optionally at Block 418, a unicast radio bearer and a unicast PDU session can be established. In an aspect, radio bearer component 254, e.g., in conjunction with processor(s) 212, memory 216, transceiver 202, communicating component 242, etc., can establish (e.g., with a base station 102) the unicast radio bearer and the unicast PDU session. For example, radio bearer component 254 can establish the unicast radio bearer with a unicast serving cell, and thus can transmit the measurement report to the unicast serving cell for possibly setting up a multicast radio bearer.

In method 500, optionally at Block 514, a unicast radio bearer and a unicast PDU session can be established with the UE. In an aspect, radio bearer managing component 354, e.g., in conjunction with processor(s) 312, memory 316, transceiver 302, configuring component 342, etc., can establish, with the UE, the unicast radio bearer and the unicast PDU session. In this example, base station 102 may receive, from the UE 104, the measurement report and may determine to setup a multicast cell for the UE 104 based on the measurement report to provide multicast and unicast services. In this example, the UE 104 can be operating in State 2, as described in FIG. 6.

In this example, in method 500, optionally at Block 516, it can be determined, based on the measurement report, to request setup of the multicast radio bearer with a multicast cell. In an aspect, radio bearer managing component 354, e.g., in conjunction with processor(s) 312, memory 316, transceiver 302, configuring component 342, etc., can determine, based on the measurement report, to request setup of the multicast radio bearer with the multicast cell. For example, radio bearer managing component 354 can determine to request setup of the multicast radio bearer based on a cell measurement reported by the UE 104 for the multicast cell. In an example, where the cell measurement for the multicast cell achieves a threshold and/or where a cell measurement for the serving unicast cell provided by the base station 102 does not achieve a threshold, radio bearer managing component 354 can determine to request setup of the multicast radio bearer. In this example, radio bearer managing component 354 can transmit (e.g., to UE 104 at Block 504) the request to setup the multicast radio bearer.

In this example, receiving at Block 404 can include receiving, from the base station and based on the measurement report, the request to setup the multicast radio bearer. Accordingly, in this example in method 400, optionally at Block 420, the multicast radio bearer can be established with the multicast cell. In an aspect, radio bearer component 254, e.g., in conjunction with processor(s) 212, memory 216, transceiver 202, communicating component 242, etc., can establish, based on the received request, the multicast radio bearer with the multicast cell. For example, radio bearer component 254 and/or radio bearer managing component 354 can cause the UE 104 to perform a MOOD operation to setup the multicast radio bearer with the multicast cell, where the multicast cell can be a different cell than (or the same cell as) the established unicast cell. In this example, the UE 104 can transition from State 2 to State 3, as described. In this example, the base station 102 can require the UE 104 to measure the multicast cell in the measurement configuration indicated to the UE 104 (e.g., in a neighbor list). When the measurement of the multicast cell is higher than a threshold and content is transmitted on the multicast session, the core network function can setup the MRB for the UE and can push data contents on both the URB and MRB. As described, the base station 102 can setup the MRB for the UE 104 per UE's request or without UE's request. Moreover, in this example, optionally at Block 416, data received over the unicast or multicast radio bearer can be selected or data received over the unicast and multicast radio bearers can be combined. In an aspect, communicating component 242, e.g., in conjunction with processor(s) 212, memory 216, transceiver 202, etc., can select data received over the unicast or multicast radio bearer or combine data received over the unicast and multicast radio bearers where both radio bearers are setup, as described.

In another example, in method 500, optionally at Block 518, it can be determined, based on the measurement report, to request release of the unicast radio bearer for a unicast cell. In an aspect, radio bearer managing component 354, e.g., in conjunction with processor(s) 312, memory 316, transceiver 302, configuring component 342, etc., can determine, based on the measurement report, to request release of the unicast radio bearer for the unicast cell. As described, for example, radio bearer managing component 354 can determine to request release of the unicast radio bearer based at least in part on determining that a cell measurement reported for the unicast cell does not achieve a threshold and/or determining that a cell measurement reported for the multicast cell achieves a threshold (e.g., for at least a required time). In this example, the UE 104 can be operating in State 3, as described in FIG. 6.

In this example in method 400, optionally at Block 422, the unicast radio bearer with a unicast cell can be released based on the received request. In an aspect, radio bearer component 254, e.g., in conjunction with processor(s) 212, memory 216, transceiver 202, communicating component 242, etc., can release, based on the received request, the unicast radio bearer with the unicast cell. For example, this can occur in either example above where the UE 104 has a URB with a unicast cell and a MRB with a multicast cell. In this example, the UE 104 can transition from State 3 to State 1, as described above. The unicast PDU session, in this example, may be terminated or may be maintained at least temporarily to avoid ping-pong effect of frequently setting up and releasing the unicast radio bearer based on changing radio conditions.

Thus, in an example in method 400, optionally at Block 424, the unicast PDU session can be retained for at least a period of time. In an aspect, radio bearer component 254, e.g., in conjunction with processor(s) 212, memory 216, transceiver 202, communicating component 242, etc., can retain the unicast PDU session for at least the period of time. Fr example, the period of time may be configured for the UE 104 (e.g., by the base station 102 or otherwise by a wireless communication technology and thus stored in memory 216 of the UE 104). Similarly, in method 500, optionally at Block 520, the unicast PDU session can be retained for at least a period of time. In an aspect, radio bearer managing component 354, e.g., in conjunction with processor(s) 312, memory 316, transceiver 302, configuring component 342, etc., can retain (e.g., with a core network component) the unicast PDU session for at least the period of time. In this regard, the UE 104 can establish a subsequent unicast radio bearer with a unicast cell and can continue using the established PDU session to avoid ping-pong effect, as described.

In another example, in method 500, optionally at Block 522, it can be determined, based on the measurement report, to request release of the multicast radio bearer for a multicast cell. In an aspect, radio bearer managing component 354, e.g., in conjunction with processor(s) 312, memory 316, transceiver 302, configuring component 342, etc., can determine, based on the measurement report, to request release of the multicast radio bearer for the multicast cell. As described, for example, radio bearer managing component 354 can determine to request release of the multicast radio bearer based at least in part on determining that a cell measurement reported for the multicast cell does not achieve a threshold and/or determining that a cell measurement reported for the unicast cell achieves a threshold (e.g., for at least a required time). In another example, radio bearer managing component 354 can determine to request release of the multicast radio bearer based at least in part on determining that the multicast session of the content is released. In this example, the UE 104 can be operating in State 3, as described in FIG. 6.

In this example in method 400, optionally at Block 426, the multicast radio bearer with a multicast cell can be released based on the received request. In an aspect, radio bearer component 254, e.g., in conjunction with processor(s) 212, memory 216, transceiver 202, communicating component 242, etc., can release, based on the received request, the multicast radio bearer with the multicast cell. For example, this can occur in either example above where the UE 104 has a URB with a unicast cell and a MRB with a multicast cell. In this example, the UE 104 can transition from State 3 to State 2, as described above.

In another example, in method 500, optionally at Block 524, it can be determined, based on the measurement report, to perform unicast and multicast switching. In an aspect, radio bearer managing component 354, e.g., in conjunction with processor(s) 312, memory 316, transceiver 302, configuring component 342, etc., can determine, based on the measurement report, to perform unicast and multicast switching. For example, where the unicast cell is determined to have a signal measurement that achieves a threshold and/or where the multicast cell is determined to have a signal measurement that does not achieve a threshold (e.g., and/or where a difference in measurements between the cells achieves a threshold), radio bearer managing component 354 can determine to perform multicast and unicast switching to switch multicast communications to the unicast radio bearer (and/or vice versa).

In this example in method 400, optionally at Block 428, multicast and unicast switching can be performed based on the received request. In an aspect, radio bearer component 254, e.g., in conjunction with processor(s) 212, memory 216, transceiver 202, communicating component 242, etc., can perform, based on the received request, multicast and unicast switching (e.g., to switch multicast communications to the unicast radio bearer).

Figure 7:
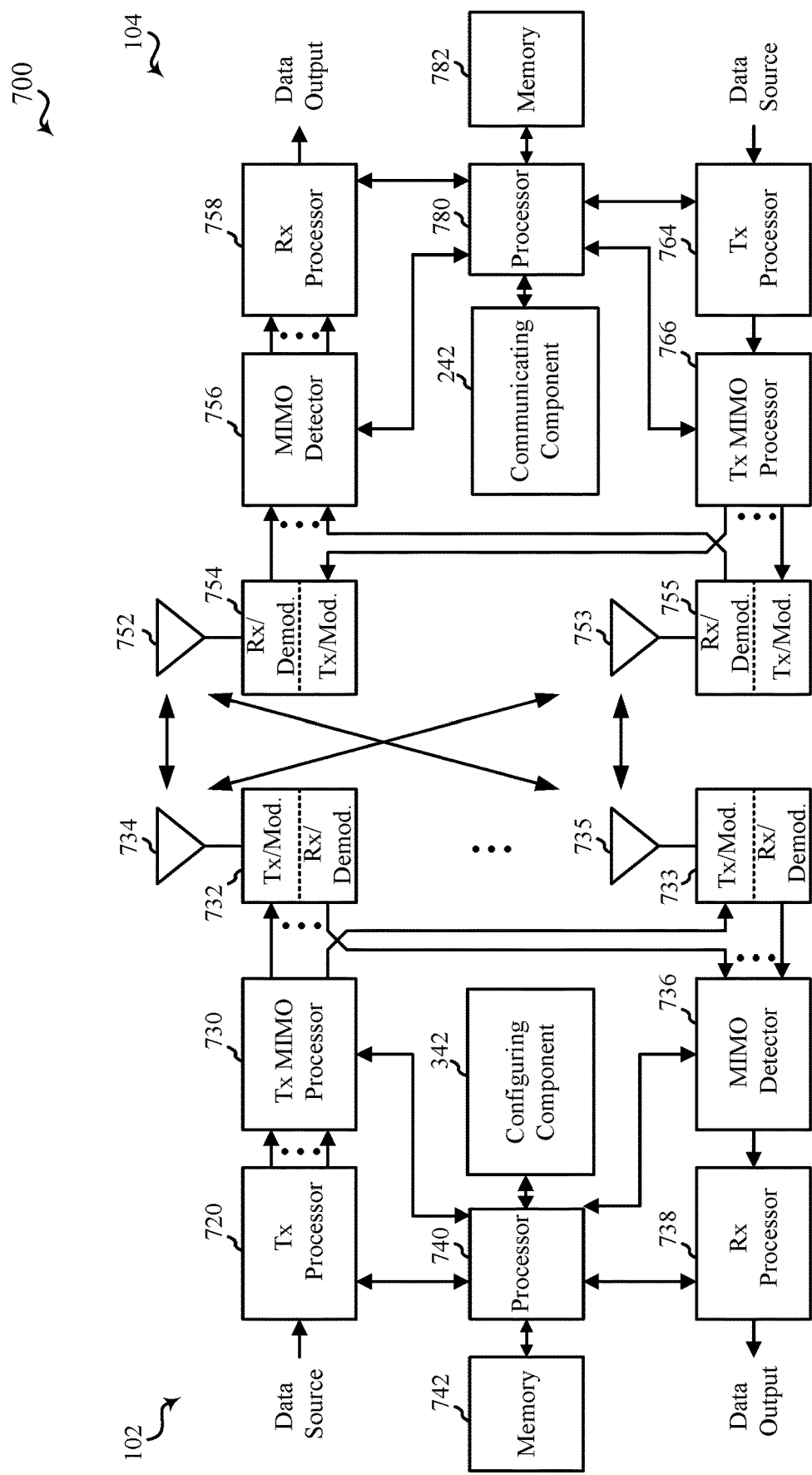
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a configuring component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communication, comprising:
   transmitting, to a base station, a measurement report including measurements of signals received from one or more cells; and
   receiving, from the base station and based on the measurement report, at least one of a request to setup or release a unicast radio bearer or a multicast radio bearer for at least one cell of the one or more cells, a request to setup a unicast protocol data unit (PDU) session over a unicast radio bearer, a command for multicast and unicast switching, or any combination thereof, wherein the unicast PDU session and a multicast PDU session correspond to same content from a same origin server.

2. The method of example 1, further comprising:
   establishing, with the base station, a multicast radio bearer and the multicast PDU session for communicating in a multicast cell provided by the base station, wherein receiving includes receiving the request to setup the unicast radio bearer for the at least one cell as a unicast cell; and
   establishing, based on the request, the unicast radio bearer with the unicast cell.

3. The method of example 2, further comprising requesting setup of the unicast radio bearer for the at least one cell based at least in part on determining that a first measurement of a first signal received from the multicast cell is lower than a first threshold and that a second measurement of a second signal received from the unicast cell is at least a second threshold.

4. The method of any of examples 2 or 3, wherein receiving further includes receiving the request to setup the unicast PDU session over the unicast radio bearer, and further comprising establishing the unicast PDU session with the unicast cell based on the unicast radio bearer.

5. The method of any of examples 2 to 4, wherein receiving further includes receiving the request to setup the unicast PDU session over the unicast radio bearer, and further comprising mapping the multicast PDU session additionally to the unicast radio bearer.

6. The method of example 5, wherein the unicast radio bearer and the multicast radio bearer map to different quality of service (QoS) flows.

7. The method of any of examples 2 to 6, further comprising selecting data received over the unicast radio bearer or the multicast radio bearer based on a radio connection with the unicast cell or the multicast cell.

8. The method of any of examples 2 to 7, further comprising combining data received over the unicast radio bearer and the multicast radio bearer.

9. The method of any of examples 1 to 8, further comprising:
   establishing, with the base station, a unicast radio bearer and a unicast PDU session for communicating in a unicast cell provided by the base station, wherein receiving includes receiving the request to setup the multicast radio bearer for the at least one cell as a multicast cell; and
   establishing, based on the request, the multicast radio bearer with the multicast cell.

10. The method of example 9, further comprising requesting setup of the multicast radio bearer for the at least one cell based at least in part on determining that a measurement of a signal received from the multicast cell is at least a threshold.

11. The method of any of examples 1 to 10, further comprising:
    establishing, with the base station, a multicast radio bearer and the multicast PDU session for communicating in a multicast cell provided by the base station, and establishing a unicast radio bearer and a unicast PDU session for communicating in a unicast cell, wherein receiving includes receiving the request to release the unicast radio bearer; and
    releasing, based on the request, the unicast radio bearer with the unicast cell.

12. The method of example 11, further comprising retaining the unicast PDU session for at least a period of time for subsequent communications over a different unicast radio bearer.

13. The method of any of examples 1 to 12, further comprising:
    establishing, with the base station, a unicast radio bearer and a unicast PDU session for communicating in a unicast cell provided by the base station, and establishing a multicast radio bearer and the multicast PDU session for communicating in a multicast cell, wherein receiving includes receiving the request to release the multicast radio bearer; and
    releasing, based on the request, the multicast radio bearer with the multicast cell.

14. The method of any of examples 1 to 13, wherein the measurements of the signals include one or more of reference signal received power (RSRP), reference signal received quality (RSRQ), signal-to-noise ratio (SNR), or signal-to-interference-and-noise ratio (SINR), and wherein the signals include one or more of a synchronization signal block (SSB) signal, channel state information reference signal (CSI-RS), or cell-specific reference signal (CRS).

15. The method of any of examples 1 to 14, wherein the transmission to the base station is based on one or more triggers, and wherein the one or more triggers include one or more determinations based on a value of the measurements of the one or more signals received from the one or more cells including at least a measurement a cell provided by the base station.

16. A method for wireless communication, comprising:
    receiving, from a user equipment (UE), a measurement report including measurements of signals received from one or more cells; and
    transmitting, to the UE and based on the measurement report, at least one of a request to setup or release a unicast radio bearer or a multicast radio bearer for at least one cell of the one or more cells, a request to setup a unicast protocol data unit (PDU) session over a unicast radio bearer, or a command for multicast and unicast switching, wherein the unicast PDU session and a multicast PDU session correspond to same content from a same origin server.

17. The method of example 16, further comprising:
    establishing, with the UE, the multicast radio bearer and a multicast PDU session for communicating in a multicast cell; and determining, based on the measurement report, to request setup of the unicast radio bearer for the at least one cell of the one or more cells as a unicast cell, wherein transmitting includes transmitting, to the UE, the request to setup the unicast radio bearer for the at least one cell.
18. The method of example 17, wherein determining to setup of the unicast radio bearer for the at least one cell is based at least in part on determining that a first measurement indicated for the multicast cell is lower than a first threshold and that a second measurement indicated for the unicast cell is at least a second threshold.
19. The method of any of examples 17 or 18, wherein transmitting further includes transmitting the request to setup the unicast PDU session over the unicast radio bearer.
20. The method of any of examples 17 to 19, further comprising mapping the multicast PDU session additionally to the unicast radio bearer.
21. The method of example 20, wherein the unicast radio bearer and the multicast radio bearer map to different quality of service (QoS) flows.
22. The method of any of examples 16 to 21, further comprising:
establishing, with the UE, a unicast radio bearer and a unicast PDU session for communicating in a unicast cell; and
determining, based on the measurement report, to request setup of the multicast radio bearer for the at least one cell of the one or more cells as a multicast cell, wherein transmitting includes transmitting, to the UE, the request to setup the multicast radio bearer for the at least one cell.
23. The method of example 22, wherein determining to setup of the multicast radio bearer for the at least one cell is based at least in part on determining that a first measurement indicated for the multicast cell is at least a second threshold.
24. The method of any of examples 22 or 23, wherein determining to setup of the multicast radio bearer for the at least one cell is based at least in part on determining data for transmitting on a multicast session.
25. The method of any of examples 16 to 24, further comprising determining, based on the measurement report, to request release of the unicast radio bearer for a unicast cell, wherein transmitting includes transmitting, to the UE, the request to release the unicast radio bearer for the unicast cell.
26. The method of example 25, further comprising retaining, for the UE, the unicast PDU session for at least a period of time for subsequent communications over a different unicast radio bearer.
27. The method of any of examples 16 to 26, further comprising determining, based on the measurement report, to request release of the multicast radio bearer for a multicast cell, wherein transmitting includes transmitting, to the UE, the request to release the multicast radio bearer for the multicast cell.
28. The method of example 27, wherein determining to request release of the multicast radio bearer is based on determining that a multicast session is released.
29. The method of any of examples 16 to 28, wherein the measurements of the signals include one or more of reference signal received power (RSRP), reference signal received quality (RSRQ) or signal-to-noise ratio (SNR), and wherein the signals include one or more of a synchronization signal block (SSB) signal, channel state information reference signal (CSI-RS), or cell-specific reference signal (CRS).
30. An apparatus for wireless communication, comprising:
a transceiver;
a memory configured to store instructions; and
one or more processors communicatively coupled with the memory and the transceiver, wherein the one or more processors are configured to perform one or more of the methods of any of examples 1 to 29.
31. An apparatus for wireless communication, comprising means for performing one or more of the methods of any of examples 1 to 29.
32. A computer-readable medium, comprising code executable by one or more processors for wireless communications, the code comprising code for performing one or more of the methods of any of examples 1 to 29.

What is claimed is:
1. A method for wireless communication, comprising:
transmitting, to a network node, a measurement report including measurements of signals received from one or more cells; and
receiving, from the network node and based on the measurement report, at least one of a request to setup or release a unicast radio bearer or a multicast radio bearer for at least one cell of the one or more cells, a request to setup a unicast protocol data unit (PDU) session over a unicast radio bearer, a command for multicast and unicast switching, or any combination thereof, wherein the unicast PDU session and a multicast PDU session correspond to same content from a same origin server.
2. The method of claim 1, further comprising:
establishing, with the network node, a multicast radio bearer and the multicast PDU session for communicating in a multicast cell provided by the network node, wherein receiving includes receiving the request to setup the unicast radio bearer for the at least one cell as a unicast cell; and
establishing, based on the request, the unicast radio bearer with the unicast cell.
3. A method for wireless communication, comprising:
receiving, for a user equipment (UE), a measurement report including measurements of signals received from one or more cells; and
transmitting, to the UE and based on the measurement report, at least one of a request to setup or release a unicast radio bearer or a multicast radio bearer for at least one cell of the one or more cells, a request to setup a unicast protocol data unit (PDU) session over a unicast radio bearer, or a command for multicast and unicast switching, wherein the unicast PDU session and a multicast PDU session correspond to same content from a same origin server.
4. The method of claim 3, further comprising:
establishing, with the UE, the multicast radio bearer and a multicast PDU session for communicating in a multicast cell; and
determining, based on the measurement report, to request setup of the unicast radio bearer for the at least one cell of the one or more cells as a unicast cell, wherein transmitting includes transmitting, to the UE, the request to setup the unicast radio bearer for the at least one cell.

5. An apparatus for wireless communication, comprising:
a processor;
memory coupled with the processor; and
instructions stored in the memory and operable, when executed by the processor, cause the apparatus to:
transmit, to a network node, a measurement report including measurements of signals received from one or more cells; and
receive, from the network node and based on the measurement report, at least one of a request to setup or release a unicast radio bearer or a multicast radio bearer for at least one cell of the one or more cells, a request to setup a unicast protocol data unit (PDU) session over a unicast radio bearer, a command for multicast and unicast switching, or any combination thereof, wherein the unicast PDU session and a multicast PDU session correspond to same content from a same origin server.

6. The apparatus of claim 5, wherein the instructions, when executed by the processor, cause the apparatus to:
establish, with the network node, a multicast radio bearer and the multicast PDU session for communicating in a multicast cell provided by the network node, wherein the instructions, when executed by the processor, cause the apparatus to receive the request to setup the unicast radio bearer for the at least one cell as a unicast cell; and
establish, based on the request, the unicast radio bearer with the unicast cell.

7. The apparatus of claim 6, wherein the instructions, when executed by the processor, cause the apparatus to request setup of the unicast radio bearer for the at least one cell based at least in part on determining that a first measurement of a first signal received from the multicast cell is lower than a first threshold and that a second measurement of a second signal received from the unicast cell is at least a second threshold.

8. The apparatus of claim 6, wherein the instructions, when executed by the processor, cause the apparatus to receive the request to setup the unicast PDU session over the unicast radio bearer, and establish the unicast PDU session with the unicast cell based on the unicast radio bearer.

9. The apparatus of claim 6, wherein the instructions, when executed by the processor, cause the apparatus to receive the request to setup the unicast PDU session over the unicast radio bearer, and map the multicast PDU session additionally to the unicast radio bearer.

10. The apparatus of claim 9, wherein the unicast radio bearer and the multicast radio bearer map to different quality of service (QOS) flows.

11. The apparatus of claim 6, wherein the instructions, when executed by the processor, cause the apparatus to select data received over the unicast radio bearer or the multicast radio bearer based on a radio connection with the unicast cell or the multicast cell.

12. The apparatus of claim 6, wherein the instructions, when executed by the processor, cause the apparatus to combine data received over the unicast radio bearer and the multicast radio bearer.

13. The apparatus of claim 5, wherein the instructions, when executed by the processor, cause the apparatus to:
establish, with the network node, a unicast radio bearer and a unicast PDU session for communicating in a unicast cell provided by the network node, wherein the instructions, when executed by the processor, cause the apparatus to receive the request to setup the multicast radio bearer for the at least one cell as a multicast cell; and
establish, based on the request, the multicast radio bearer with the multicast cell.

14. The apparatus of claim 13, wherein the instructions, when executed by the processor, cause the apparatus to request setup of the multicast radio bearer for the at least one cell based at least in part on determining that a measurement of a signal received from the multicast cell is at least a threshold.

15. The apparatus of claim 5, wherein the instructions, when executed by the processor, cause the apparatus to:
establish, with the network node, a multicast radio bearer and the multicast PDU session for communicating in a multicast cell provided by the network node, and establish a unicast radio bearer and a unicast PDU session for communicating in a unicast cell, wherein the instructions, when executed by the processor, cause the apparatus to receive the request to release the unicast radio bearer; and
release, based on the request, the unicast radio bearer with the unicast cell.

16. The apparatus of claim 15, wherein the instructions, when executed by the processor, cause the apparatus to retain the unicast PDU session for at least a period of time for subsequent communications over a different unicast radio bearer.

17. The apparatus of claim 5, wherein the instructions, when executed by the processor, cause the apparatus to:
establish, with the network node, a unicast radio bearer and a unicast PDU session for communicating in a unicast cell provided by the network node, and establish a multicast radio bearer and the multicast PDU session for communicating in a multicast cell, wherein the instructions, when executed by the processor, cause the apparatus to receive the request to release the multicast radio bearer; and
release, based on the request, the multicast radio bearer with the multicast cell.

18. The apparatus of claim 5, wherein the measurements of the signals include one or more of reference signal received power (RSRP), reference signal received quality (RSRQ), signal-to-noise ratio (SNR), or signal-to-interference-and-noise ratio (SINR), and wherein the signals include one or more of a synchronization signal block (SSB) signal, channel state information reference signal (CSI-RS), or cell-specific reference signal (CRS).

19. The apparatus of claim 5, wherein the transmission to the network node is based on one or more triggers, and wherein the one or more triggers include one or more determinations based on a value of the measurements of the one or more signals received from the one or more cells including at least a measurement a cell provided by the network node.

20. An apparatus for wireless communication, comprising:
a processor;
memory coupled with the processor; and
instructions stored in the memory and operable, when executed by the processor, cause the apparatus to:
receive, for a user equipment (UE), a measurement report including measurements of signals received from one or more cells; and
transmit, to the UE and based on the measurement report, at least one of a request to setup or release a unicast radio bearer or a multicast radio bearer for at least one cell of the one or more cells, a request to setup a unicast protocol data unit (PDU) session over a unicast radio bearer, or a command for multicast and unicast switching, wherein the unicast PDU session and a multicast PDU session correspond to same content from a same origin server.

21. The apparatus of claim 20, wherein the instructions, when executed by the processor, cause the apparatus to:
establish, with the UE, the multicast radio bearer and a multicast PDU session for communicating in a multicast cell; and
determine, based on the measurement report, to request setup of the unicast radio bearer for the at least one cell of the one or more cells as a unicast cell, wherein the instructions, when executed by the processor, cause the apparatus to transmit, to the UE, the request to setup the unicast radio bearer for the at least one cell.

22. The apparatus of claim 21, wherein the instructions, when executed by the processor, cause the apparatus to determine to setup of the unicast radio bearer for the at least one cell based at least in part on determining that a first measurement indicated for the multicast cell is lower than a first threshold and that a second measurement indicated for the unicast cell is at least a second threshold.

23. The apparatus of claim 21, wherein the instructions, when executed by the processor, cause the apparatus to transmit the request to setup the unicast PDU session over the unicast radio bearer.

24. The apparatus of claim 21, wherein the instructions, when executed by the processor, cause the apparatus to map the multicast PDU session additionally to the unicast radio bearer, and wherein the unicast radio bearer and the multicast radio bearer map to different quality of service (QOS) flows.

25. The apparatus of claim 20, wherein the instructions, when executed by the processor, cause the apparatus to:
establish, with the UE, a unicast radio bearer and a unicast PDU session for communicating in a unicast cell; and
determine, based on the measurement report, to request setup of the multicast radio bearer for the at least one cell of the one or more cells as a multicast cell, wherein the instructions, when executed by the processor, cause the apparatus to transmit, to the UE, the request to setup the multicast radio bearer for the at least one cell.

26. The apparatus of claim 25, wherein the instructions, when executed by the processor, cause the apparatus to determine to setup of the multicast radio bearer for the at least one cell based at least in part on at least one of determining that a first measurement indicated for the multicast cell is at least a second threshold or determining data for transmitting on a multicast session.

27. The apparatus of claim 20, wherein the instructions, when executed by the processor, cause the apparatus to determine, based on the measurement report, to request release of the unicast radio bearer for a unicast cell, wherein the instructions, when executed by the processor, cause the apparatus to transmit, to the UE, the request to release the unicast radio bearer for the unicast cell.

28. The apparatus of claim 27, wherein the instructions, when executed by the processor, cause the apparatus to retain, for the UE, the unicast PDU session for at least a period of time for subsequent communications over a different unicast radio bearer.

29. The apparatus of claim 20, wherein the instructions, when executed by the processor, cause the apparatus to determine, based on the measurement report, to request release of the multicast radio bearer for a multicast cell, wherein the instructions, when executed by the processor, cause the apparatus to transmit, to the UE, the request to release the multicast radio bearer for the multicast cell.

30. The apparatus of claim 20, wherein the measurements of the signals include one or more of reference signal received power (RSRP), reference signal received quality (RSRQ) or signal-to-noise ratio (SNR), and wherein the signals include one or more of a synchronization signal block (SSB) signal, channel state information reference signal (CSI-RS), or cell-specific reference signal (CRS).

* * * * *